United States Patent
Layouni et al.

(10) Patent No.: US 11,863,993 B2
(45) Date of Patent: Jan. 2, 2024

(54) AUTOMATED LIGHTWEIGHT AND SECURE DEVICE PAIRING

(71) Applicant: GM GLOBAL TECHNOLOGY OPERATIONS LLC, Detroit, MI (US)

(72) Inventors: Mohamed A. Layouni, Warren, MI (US); Kiana Karimpoor, Toronto (CA); Haroon Ali Akbar, Toronto (CA); David N. Yang, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 371 days.

(21) Appl. No.: 17/192,167

(22) Filed: Mar. 4, 2021

(65) Prior Publication Data
US 2022/0286862 A1    Sep. 8, 2022

(51) Int. Cl.
| | |
|---|---|
| *H04W 12/55* | (2021.01) |
| *H04W 12/041* | (2021.01) |
| *H04W 4/80* | (2018.01) |
| *H04W 4/40* | (2018.01) |
| *H04W 12/0471* | (2021.01) |

(52) U.S. Cl.
CPC ............. *H04W 12/55* (2021.01); *H04W 4/40* (2018.02); *H04W 4/80* (2018.02); *H04W 12/041* (2021.01); *H04W 12/0471* (2021.01)

(58) Field of Classification Search
CPC ..... H04W 4/80; H04W 12/55; H04W 12/041; H04W 4/40; H04W 12/0471
See application file for complete search history.

(56) References Cited

U.S. PATENT DOCUMENTS

| | | | | |
|---|---|---|---|---|
| 8,316,237 | B1* | 11/2012 | Felsher | H04L 9/3249 380/282 |
| 9,154,483 | B1* | 10/2015 | Haskin | H04L 63/08 |
| 2017/0012974 | A1* | 1/2017 | Sierra | H04W 12/08 |
| 2019/0092283 | A1* | 3/2019 | Kristinsson | H04W 12/065 |
| 2019/0097982 | A1* | 3/2019 | Bhattacharyya | H04L 9/14 |
| 2023/0093016 | A1* | 3/2023 | Shi | H04B 7/00 370/329 |

* cited by examiner

*Primary Examiner* — Oussama Roudani
(74) *Attorney, Agent, or Firm* — CANTOR COLBURN LLP

(57) ABSTRACT

A method for automatic pairing of two devices for wireless communication includes detecting, by a first device, that a second device is in a communicable range of the first device, where the first device has not been paired with the second device for wireless communication. The method may include determining, by the first device, by communicating with a third device, that the second device is paired with the third device. The first device and the third device are also paired previously. The method may include transmitting, by the third device, a key material to the second device. The method may include confirming, by the first device and by the second device, that the key material matches. The method may include establishing, by the first device, a communication link with the second device for wireless communication in response to the key material being a match.

20 Claims, 4 Drawing Sheets

AUTOMATED LIGHTWEIGHT AND SECURE DEVICE PAIRING

INTRODUCTION

The subject disclosure relates to electronic communication devices, particularly automated lightweight and secure device pairing, leveraging existing authenticated sessions.

Wireless communication technology, such as BLUETOOTH®, has become a popular feature in vehicles. Many vehicles now include a driver or occupant's capability to wirelessly connect a personal consumer electronics device with the vehicle's embedded entertainment and communication systems using such communication technology. One example of this is using a vehicle's microphone and speaker system to operate a driver's mobile phone in a hands-free fashion. Another example is playing music from a personal music player through the vehicle's stereo sound system.

Accordingly, it is desirable to provide methods and systems for pairing a device with the vehicle's infotainment system. Furthermore, other desirable features and characteristics of the innovations described herein will become apparent from the subsequent detailed description and the appended claims, taken in conjunction with the accompanying drawings and the technical field and background.

SUMMARY

One aspect of the present disclosure relates to a method for an automatic pairing of two devices for wireless communication. The method may include detecting, by a first device, a second device in a communicable range of the first device, where the first device has not been paired with the second device for wireless communication. The method may include determining, by the first device, by communicating with a third device, that the second device is paired with the third device. The first device and the third device are also paired previously. The method may include transmitting, by the third device, a key material to the second device. The method may include confirming, by the first device and by the second device, that the key material matches. The method may include establishing, by the first device, a communication link with the second device for wireless communication in response to the key material being a match.

In one or more embodiments, confirming that the key material matches at the first device and the second device includes computing, by the first device and by the second device, a predetermined function using the key material as a parameter and comparing respective outputs of the predetermined function. The predetermined function includes one from the group of out-of-band pairing confirmation, numeric comparison pairing confirmation, and passkey entry confirmation.

In one or more embodiments, a prompt is displayed to a user to notify that the first device and the second device have been paired. The prompt includes a user-interaction element to delete the pairing between the first device and the second device. In one or more embodiments, the prompt is displayed on the first device.

In one or more embodiments, the first device is a vehicle infotainment system, and the third device is a vehicle key controller.

In another aspect, a system is described that includes a first device, a second device, and a third device that is paired for communication with the first device. The first device detects that the second device is in a communicable range of the first device and that the first device has not been paired with the second device for wireless communication. The first device determines, by communicating with the third device, that the second device is paired with the third device. Further, the first device causes the third device to transmit a key material to the second device. Further, the first device confirms with the second device that the key material matches. Further, the first device establishes a communication link with the second device for wireless communication in response to the key material being a match.

In one or more embodiments, confirming that the key material matches at the first device and the second device includes computing, by the first device and by the second device, a predetermined function using the key material as a parameter and comparing respective outputs of the predetermined function. The predetermined function includes one from the group of out-of-band pairing confirmation, numeric comparison pairing confirmation, and passkey entry confirmation.

In one or more embodiments, a prompt is displayed to a user to notify that the first device and the second device have been paired. The prompt includes a user-interaction element to delete the pairing between the first device and the second device. In one or more embodiments, the prompt is displayed on the first device.

In one or more embodiments, the first device is a vehicle infotainment system, and the third device is a vehicle key controller.

In yet another aspect, a vehicle includes a first device that includes a computer readable storage device having instructions that are executable by one or more processors to perform a method. The method includes detecting, by the first device, a second device in a communicable range of the first device, wherein the first device has not been paired with the second device for wireless communication. Further, the method includes determining, by the first device, by communicating with a third device, that the second device is paired with the third device, wherein the first device and the third device being paired previously. Further, the method includes causing the third device to transmit a key material to the second device. Further, the method includes confirming, by the first device and by the second device, that the key material matches. Further, the method includes establishing, by the first device, a communication link with the second device for wireless communication in response to the key material being a match.

In one or more embodiments, confirming that the key material matches at the first device and the second device includes computing, by the first device and by the second device, a predetermined function using the key material as a parameter and comparing respective outputs of the predetermined function. The predetermined function includes one from the group of out-of-band pairing confirmation, numeric comparison pairing confirmation, and passkey entry confirmation.

In one or more embodiments, a prompt is displayed to a user to notify that the first device and the second device have been paired. The prompt includes a user-interaction element to delete the pairing between the first device and the second device. In one or more embodiments, the prompt is displayed on the first device.

In one or more embodiments, the first device is a vehicle infotainment system, and the third device is a vehicle key controller.

The above features and advantages and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
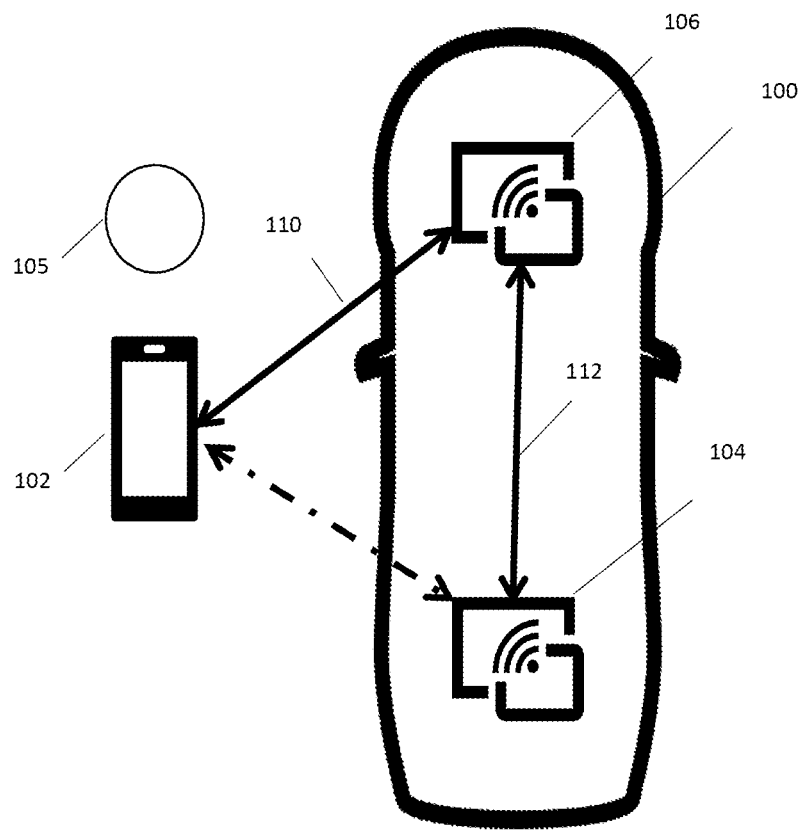
FIG. 1 is a block diagram depicting pairing between two devices according to one or more embodiments.

The following description is merely exemplary in nature and is not intended to limit the present disclosure, its application, or uses. It should be understood that corresponding reference numerals indicate like or corresponding parts and features throughout the drawings. As used herein, the term "module" refers to processing circuitry that may include an application-specific integrated circuit (ASIC), an electronic circuit, a processor (shared, dedicated, or group) and memory that executes one or more software or firmware programs, a combinational logic circuit, and/or other suitable components that provide the described functionality.

The technical solutions facilitate practical applications to improve device pairing between two communication devices to facilitate wireless communication between the two devices by simplifying and automating device pairing. Particular embodiments described herein present exemplary use cases for such pairing in vehicles.

As used herein, "pairing" two devices includes establishing a secure wireless connection between the two devices. Existing techniques to pair two devices to communicate using a wireless communication protocol, such as BLUETOOTH®, WIFI®, BLUETOOTH LOW ENERGY (BLE)®, etc., are cumbersome and present a hurdle for users. The technical challenges that cause such difficulties include security measures that are to be used when establishing a communication connection between two devices to prevent access by unknown or unauthorized devices. For example, such security measures include sharing encryption keys between the two devices and comparing alpha-numeric sequences between the two devices using out-of-band methods. Such an exchange leads to a process that is often confusing or problematic to the device users. The same problem exists in establishing certain types of WIFI connection, for example, using a wireless local area network (LAN) connectivity between two devices. Technical solutions described herein address such technical challenges and facilitate a way to maintain the security of a connection that is established between two devices and yet streamline the pairing process for the device user.

FIG. 1 is a block diagram depicting pairing between two devices according to one or more embodiments. In the depicted scenario, device-A 102 is to be paired with a device-B 104. Here, device-A 102 can be a user device such as a phone, a media player, a personal digital assistant, a headphone, a speaker, a navigation system, a tablet computer, a laptop computer, or any other communication device. In the example scenario, device-A 102 is used to access one or more operations facilitated by the device-B 104. For example, the device-B 104 can be a home theater system, a television, a computer, a vehicle infotainment system, a vehicle key controller, an engine control unit (ECU), or any other communication device. It is understood that listed above are just a few examples of device-A 102 and device-B 104, and that various other types of devices can be used in one or more embodiments. Further, device-A 102 and device-B 104 can be interchanged in one or more embodiments.

A user 105 desires that the two devices, device-A 102 and device-B 104, are paired with each other to communicate with each other. For example, such communication can enable the device-B 104 to control one or more functions of device-A 102, for example, playback media, send/receive phone calls, send/receive text messages, access navigation data/routes, etc. Alternatively, or in addition, the communication between the two devices can enable device-A 102 to control one or more functions of the device-B 104. For example, control playback of media, calls, navigation, etc., on the device-A 102 using one or more user-interface elements, such as buttons, touchscreen, etc. of the device-B 104.

As noted earlier, pairing device-A 102 and device-B 104 is cumbersome using existing techniques. For example, the user may have to manually share a passkey between the two devices or hold one device in proximity of the other device (e.g., hold the device-A 102 adjacent to the device-B 104 for at least a few seconds). Technical solutions described herein reduce such manual steps that the user has to perform, and instead automate the pairing between the device-A 102 and the device-B 104 using existing trusted sessions that the devices 102, 104 have with a mutually common device, for example, device-C 106.

As depicted in FIG. 1, device-A 102 is already paired with the device-C 106 via a first pairing 110. Also, device-B 104 is already paired with the device-C 106 via a second pairing 112.

For example, in the case of a vehicle 100, the device-C 106 can be a vehicle key controller that facilitates the user 105 to lock/unlock the doors of the vehicle 100 using the device-A 102 (e.g., a phone). The device-A 102 (phone) can be registered with the device-C 106 (vehicle key controller) previously in a secure manner. For example, the device-A 102 (phone) and the device-C 106 (virtual key controller) may be paired at the time of purchase of the vehicle 100, or at the time of purchase of the device-A 102 (phone). The device-B 104 and the device-C 106 can be paired with each other at the time of manufacture of the vehicle 100. In one or more embodiments, the device-B 104 and the device-C 106 can be paired in a wired manner, for example, using a controller area network (CAN) bus.

It should be noted that device-A 102, device-B 104, and device-C 106 are not limited to the set of devices described above and can be any other types of devices. For example, in another embodiment, device-A 102 is a headphone that is to be paired with the device-B 104 (vehicle infotainment system), and device-C 106, a phone, is already paired with both, the headphone and the vehicle infotainment system. In yet another embodiment, device-A 102 is a phone that is to be paired with a home theater system, device-B 104, where a television, device-C 106, is paired with both, the phone and the home theater system. In another example, device-C 106 is an ECU. Various other such examples are possible, and embodiments herein do not limit the types of devices that are paired using technical solutions described herein. Further, it is understood that device-A 102, device-B 104, and device-C 106 can interchange roles in one or more embodiments. For example, device-A 102 or device-B 104 can be the device that is already paired with the remaining two devices trying to be paired.

Figure 2:
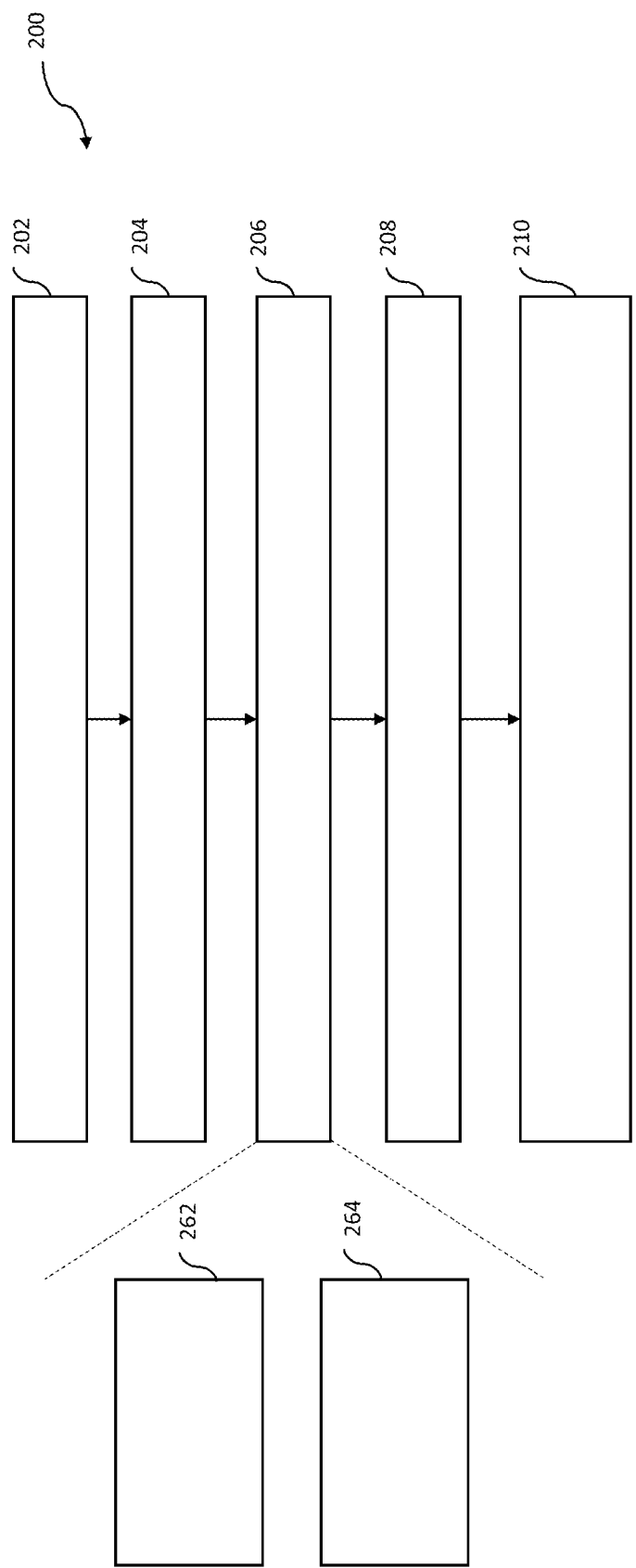
FIG. 2 depicts a flowchart of a method for automated lightweight and secure device pairing leveraging existing authenticated sessions according to one or more embodiments.

FIG. 2 depicts a flowchart of a method for automated lightweight and secure device pairing, leveraging existing authenticated sessions, according to one or more embodiments. The method 200 includes detecting, by the device-B 104, that the device-A 102 is in a communicable range of the device-B 104 at block 202. Device-B 104 further determines that the device-B 104 has not been paired with the device-A 102 for wireless communication previously. In one or more embodiments, the device-B 104 continuously detects any device that is compatible with having a wireless communication with the device-B 104 and is within a range of such wireless communication. For example, in BLUETOOTH® communication, a wireless radio (not shown) of the device-B 104 can continuously, at a predetermined frequency, scan within the predetermined range of the wireless radio for any other Bluetooth-compatible device.

At block 204, the device-B 104 determines, by communicating with the device-C 106, that the device-A 102 is paired with the device-C 106. As noted, the device-B 104 and the device-C 106 are paired previously. It should be noted that the pairing between the device-B 104 and the device-C 106 can be wireless or wired. The pairing between the device-B 104 and the device-C 106 facilitates secure communication between the device-B 104 and the device-C 106. Such secure communication can include encrypted communication in one or more embodiments.

In one or more embodiments, the device-C 106, which is already paired with device-A 102 and device-B 104, generates key material TK' to be used for pairing device-A 102 and device-B 104. The key material TK' is generated by device-C 106 by establishing a new communication session with the device-A 102 (using existing pairing) at block 262. The device-C 106 establishes a session key TK with the device-A 102 to generate the new secure communication session. The secure communication session can be established using any communication protocol such as BLUETOOTH®, WIFI®, etc., using which device-A 102 and device-C 106 are paired. In one or more embodiments, once the secure communication session is established, device-C 106 and device-A 102 use the session key TK, for example, to encrypt communication exchanges.

Device-C generates the key material TK' for pairing device-A 102 and device-B 104 based on TK, at block 264. In some embodiments, device-C 106 uses TK as the key material to pair device-A 102 and device-B 104 (i.e., TK'=TK). Alternatively, device-C 106 generates TK' based on TK using a key derivation function (KDF) (i.e., TK'=KDF(TK)). In cryptography, KDF is a cryptographic hash function that generates a "derived key" from a secret value such as the main key, a password, or a passphrase using a pseudorandom function. Keyed cryptographic hash functions are popular examples of pseudorandom functions used for a key derivation; however, the technical solutions described herein are not limited by the type of key derivation function used in one or more embodiments.

The method 200 further includes, at block 206, transmitting, by the device-C 106, a key material (TK') to the device-B 104. In some embodiments, device-C 106 can also transmit TK' to the device-A 102. Because TK is already in use by device-A 102 and device-C 106 using existing pairing, device-C 106 does not transmit TK' to device-A 102 in some embodiments. When device-B 104 initiates pairing with device-A 102, the device-A 102 derives TK', locally, using the expression TK'=KDF(TK), and uses TK' to pair with and to authenticate and decrypt messages received from device-B 104. In embodiments where device-C 106 uses TK itself as the shared key material (i.e., TK'=TK), device-A 102 can also use the existing TK, not requiring device-C 106 to transmit the key material to device-A 102. Device-C 106 informs device-A 102 that TK' has been shared with device-B 104, in response to which device-A 102 either computes TK' using the KDF or sets TK' to be the value of TK.

In embodiments where device-C 106 derives TK' from TK (i.e., TK'=KDF(TK)), device-A 102 also computes TK' based on TK, independently, using the KDF. In this case, by using the derived key material TK' (different from TK), the communication session's security between device-A 102 and device-C 106 is maintained. For example, using TK for pairing device-A 102 and device-C 106; and TK'=KDF(TK) for pairing device-A 102 and device-B 104 ensures independent secure communication protocols with different encryptions keys.

Typically, in existing solutions, device-A 102 and device-B generate TK using algorithms such as Diffie-Hellman (DH), Elliptic-Curve Diffie-Hellman (ECDH), Rivest-Shamir-Adleman (RSA), or any other such cryptographic algorithms. Such protocols require several rounds of communication between the two devices, resulting in a delay. As can be seen, the technical solutions described herein reduce such complexity and delay by avoiding the use of these protocols when pairing device-A 102 and device-B 104.

In embodiments of the technical solutions described herein, instead of running DH, ECDH, or other such protocols between device-A 102 and device-B 104, device-C 106 provides the key material TK' based on an established pairing between device-A 102 and device-C 106.

Here, a "key material" is a nonoverlapping binary string that is required to maintain cryptographic key relationships when using a secure communication session between two (or more) devices. Key material TK can be used as a parameter to establish a secure communication session.

The method 200 may include confirming, by both, device-B 104 and device-A 102, that the key material TK' matches, at block 208. The comparison is performed based on how the pairing between device-A 102 and device-B 104 is being performed. For example, if the pairing is to be performed using an out-of-band pairing function, the key-material TK' is used to compute a confirmation function by both, device-A 102 and device-B 104 independently. The confirmation function is a predetermined function that can take additional inputs apart from TK'. For example, the confirmation function can use information regarding device addresses (e.g., MAC address, communication port address, etc.) of the two devices being paired, information regarding the pairing command, etc. Each generates a random string, the device-A 102 and the device-B 104, for computing the respective confirmation function in one or more embodiments.

Figure 3:
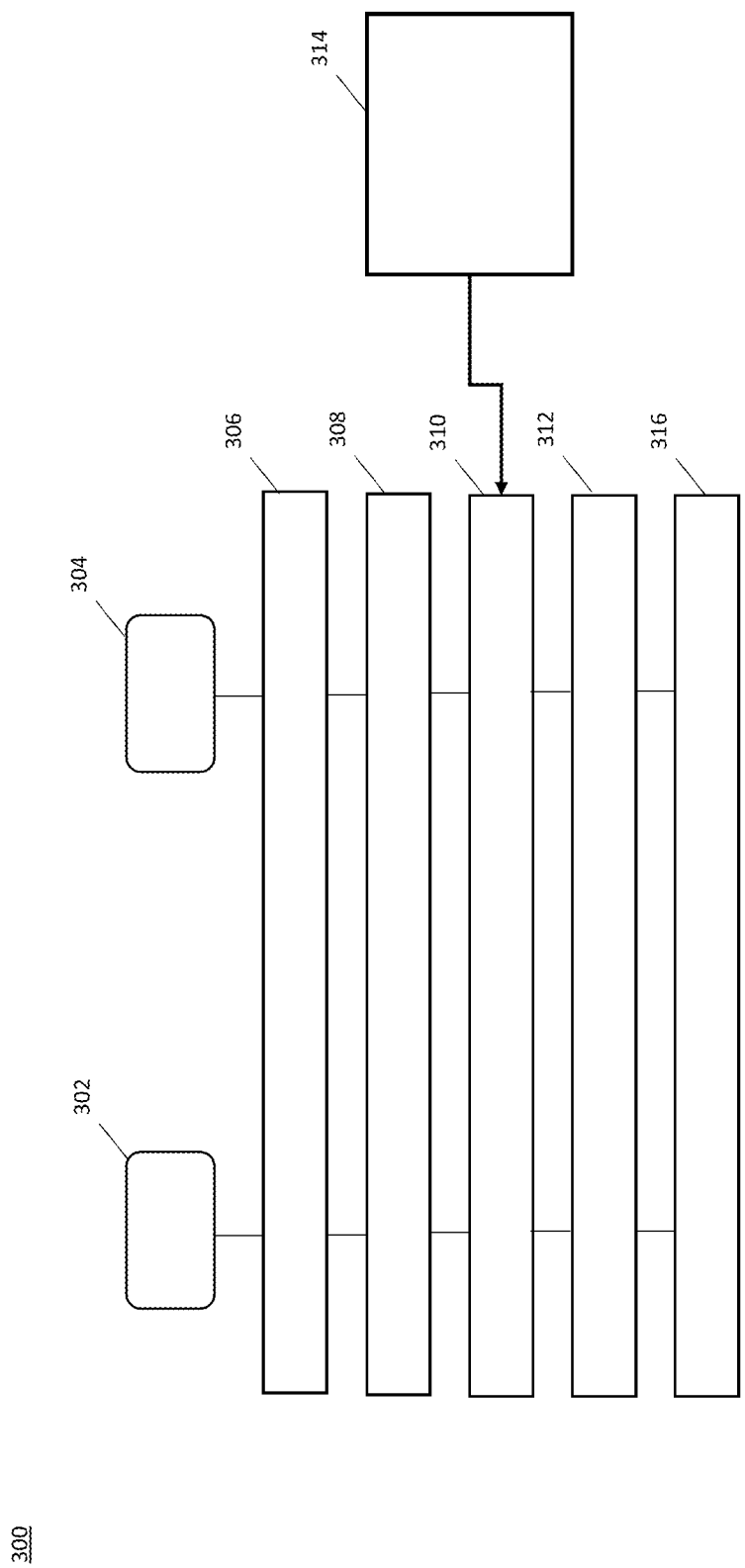
FIG. 3 is an example confirmation check performed by two devices being paired according to one or more embodiments.

FIG. 3 depicts an example confirmation check 300 performed by two devices being paired according to one or more embodiments. FIG. 3 also depicts the typical process that is performed using existing techniques using boxes with a dashed border. One or more improvements provided by the technical solutions described herein over the existing techniques will be apparent to a person skilled in the art from the depiction. FIG. 3 depicts two devices named a master-device 302 and a slave-device 304, where the master-device 302 detects the slave-device 304 in its communicable range and facilitates the pairing with the slave-device 304 in response. Alternatively, the master-device 302 initiates the pairing in response to a request to start the pairing process from the slave-device 304. It should be noted that the master-device 302 and the slave-device 304 can each be replaced by any one of the device-A 102 and the device-B 104.

As described in detail further, the master-device 302 computes a value of MConfirm (by running a known confirmation function on a set of input parameters, including TK'). The master-device 302 then sends to the slave-device 304 the input parameters used to compute MConfirm (except TK'), as well as the resulting MConfirm. The slave-device 304 uses the received input parameters along with the value of TK' that it has and computes the value of MConfirm locally and compares it to the value it received from the Master. If the two values match, the authentication succeeds, and the pairing continues. Otherwise, the pairing is aborted. Independently, the slave-device 304 computes a value of SConfirm using the predetermined confirmation function and then sends the resulting value, with the input parameters (except TK'), to the master-device 302. The master-device 302 computes the value of SConfirm locally and compares the result to the value of SConfirm received from the slave-device 304. If they match, the pairing continues, and if not, the pairing is aborted.

According to existing techniques, in one or more embodiments, the two devices, the master-device 302 and the slave-device 304, exchange their respective pairing features, at block 306. The pairing features of a first device informs the other device of the first device's pairing capabilities and vice versa.

At block 308, the two devices select a pairing algorithm based on pairing features that are exchanged by the two devices. For example, if one of the master-device 302 (or slave-device 304) is a legacy device, the pairing algorithm that is selected is one that can be executed by the legacy device and the slave-device 304 (or the master-device 302). Other factors, such as processing capability, communication network capabilities, etc., can also be considered when selecting the pairing algorithm in one or more embodiments.

At block 310, the two devices independently compute or select parameter values that are to be used for confirmation calculation. For example, each device computes a random string. Further, each device selects a value for the key material. For example, in one or more embodiments, when using an out-of-band pairing, the two devices generate values independently for the key material. Alternatively, in existing techniques, the master-device 302 may generate or receive the key material, which it then shares with the slave-device 304. Alternatively, each device independently receives a different key material, which is exchanged. In some cases, the master-device 302 and the slave-device 304 wait for a user-input of a passkey that is subsequently used as the key-material. The user 105, in such cases, has to input the same passkey into both devices. In yet other cases, where numeric comparison is used for the pairing, a public key exchange, such as a Diffie-Hellman key exchange, is performed. The public keys that are exchanged are then used for the confirmation calculation.

At block 312, the confirmation calculation is performed independently by each device, the master-device 302 and the slave-device 304. As noted earlier, the confirmation calculation is performed using a predetermined function with one or more parameters in addition to the key material.

Instead, in one or more embodiments of the technical solutions described herein, the same key material is provided to both, the master-device 302 and the slave-device 304, by device-C 106, at block 314. As noted herein, device-C 106 transmits the key material to device-B 104, while device-A 102 already has access to the key material. In some embodiments, device-C 106 transmits the key material to both, device-A 102 and device-B 104. The device-C 106 is paired with both devices, the master-device 302 and the slave-device 304 (i.e., the device-C 106 has a secure connection with both devices). As noted earlier, the device-C 106 generates a new key material that is shared with both devices. Both, the master-device 302 and the slave-device 304, use this shared key material for the confirmation calculation. Accordingly, compared to the existing techniques, sharing the key material automatically by the device-C 106 accelerates the pairing process and moreover reduces the user's interaction with the master-device 302 and/or the slave-device 304 during the pairing process.

Further, at block 316, the two devices exchange and compare the confirmation values that are the confirmation calculations' outputs. If the confirmation values do not match, the pairing is discontinued. The two devices can restart the pairing process if desired. Alternatively, if the confirmation values match, a secure communication link/session is established between the two devices. In one or more embodiments, the devices can take additional steps prior to establishing the secure communication link. For example, in one or more embodiments, the two devices share the random strings that were generated for the confirmation calculation. Each device then performs another confirmation calculation using the exchanged random strings and compares the second confirmation calculations' results. If these second confirmation values also match, the secure communication link is established (i.e., the two devices are paired).

Referring back to FIG. 2, the method 200 further includes establishing, by the device-B 104, a communication link with the device-A 102 for wireless communication in response to the confirmation values being a match, at block 210. Establishing the communication link can include generating a long-term key by each of the two devices. Alternatively, one of the devices computes the long-term key and shares it with the other device. The long-term key can be generated using known techniques and using one or more previously exchanged parameters, such as the random strings, key material, device address, etc. The long-term key can be used for encrypting data that is communicated between the two devices using the communication link during further communications. The two devices are now deemed to be paired.

Embodiments of the technical solutions described herein provide a practical application related to computing technology. Particularly, they improve the pairing of two devices to facilitate wireless communication between the two devices securely. Embodiments described herein eliminate or reduce user interaction during such pairing to a minimum while maintaining the pairing process's security. According to one or more embodiments, the technical challenges of existing pairing techniques are overcome by leveraging cryptographic key material (shared session keys) established in an out-of-band protocol to automate the secure pairing process and eliminating or minimizing user intervention.

Technical solutions described herein can be applied, for example, to the following scenario where the device-A 102 is the user's phone, and the device-C 106 and the device-B 104 are the vehicle's access module (which enables door and engine unlocking), and the vehicle's infotainment system, respectively. For example, the user's phone establishes a secure session with device-C 106 (e.g., using the CCC Digital Key authentication protocol or any other key exchange protocol). Device-C 106 can derive a new key TK' from the session key it has with the user's phone (e.g., using a key derivation function). Device-C 106 shares the result with device-B 104 via a trusted link between them (e.g., encrypted authenticated messages sent over CAN bus). The phone uses the same key derivation to derive the key TK' from the session key it has with device-C 106. Both the phone and the device-B 104 use the shared secret TK' to simplify and automate the secure pairing methods as described herein.

Embodiments of the technical solutions described herein accordingly facilitate using an existing out-of-band session-key between a client and a first device to derive key-material and use it to initiate pairing between the client and a second device with a trusted link to the first device. By using the derived key material, the pairing between the client and the second device can be made such that user intervention (e.g., pass key typing) is eliminated completely, or in some cases, kept to a minimum (e.g., pressing a yes/no button). Embodiments of the technical solutions accordingly extend secure pairing to IoT (internet-of-things) devices with limited (or without) I/O (input/output) capabilities needed to type a passkey.

Figure 4:
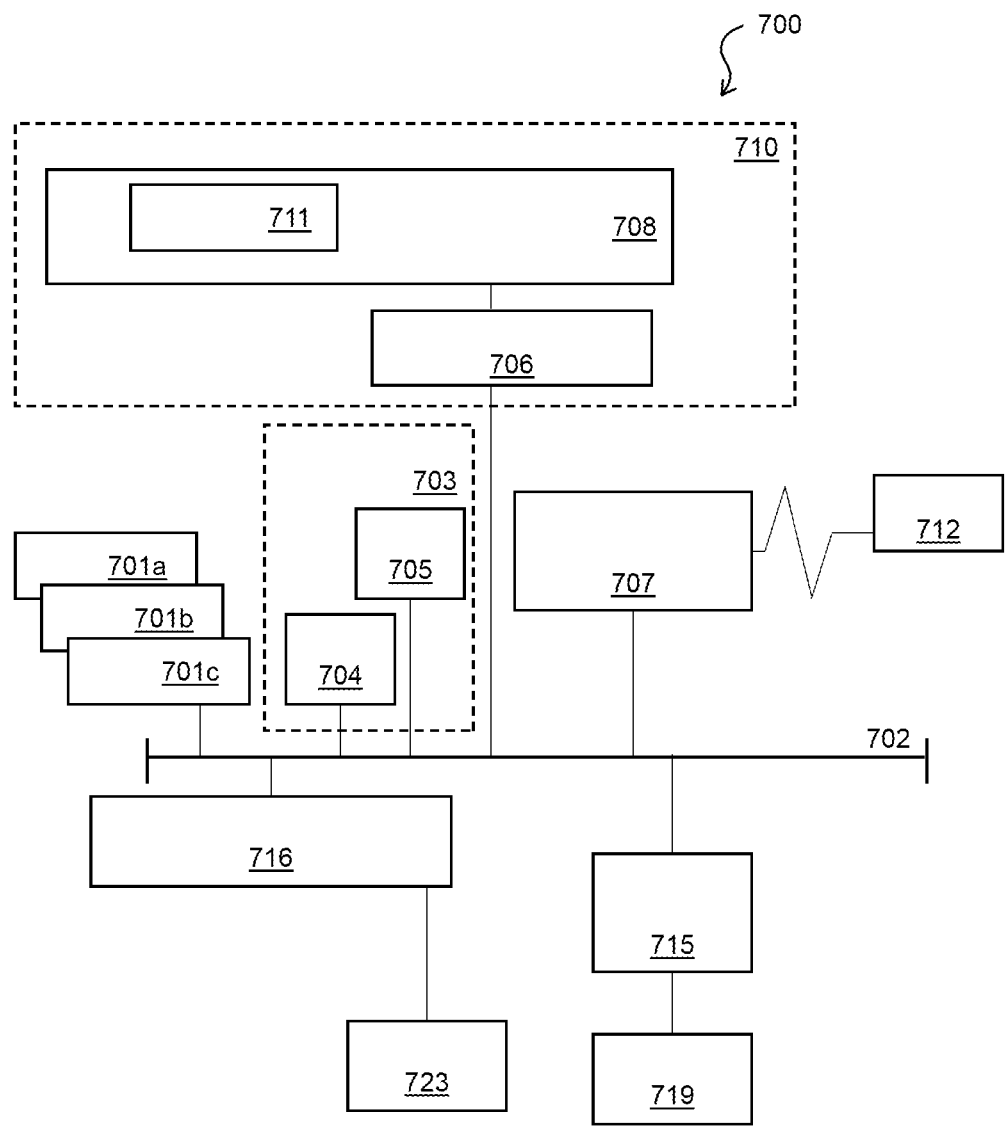
FIG. 4 is a block diagram of a computer system in accordance with an embodiment.

Turning now to FIG. 4, a computer system 700 is generally shown in accordance with an embodiment. The computer system 700 can represent one or more devices used in one or more embodiments that are described herein. The computer system 700 can be an electronic computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system to coordinate the functions of the various components shown in FIG. 4.

Additional input/output devices are shown as connected to the system bus 702 via a display adapter 715 and an interface adapter 716. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by display adapter 715, which may include a graphics controller to improve the performance of graphics intensive applications and a video controller. A keyboard, a mouse, a touchscreen, one or more buttons, a speaker, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 700 includes processing capability in the form of the processors 701, and, storage capability including the system memory 703 and the mass storage 710, input means such as the buttons, touchscreen, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 4 is not intended to indicate that the computer system 700 is to include all of the components shown in FIG. 4. Rather, the computer system 700 can include any appropriate fewer or additional components not illustrated in FIG. 4 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Embodiments of the technical solutions described herein facilitate algorithmically combining grayscale images with higher resolution and narrower FOV, which are captured from a scanning camera with the lower resolution and wider FOV images of a color camera. The color camera is static (i.e., has a fixed FOV), while the scanning camera is used to capture multiple images with the narrower FOV but capture (or overlap) the entire FOV of the color camera. The resulting image from the combination is a combined image in color, high-resolution wide FOV, with low distortion. The resulting image can be used for various AV/ADAS applications. Embodiments of the technical solutions described herein, by using such a combination, facilitate a low cost, high resolution, wide FOV camera.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method or process may be executed in a different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof

What is claimed is:

1. A computer-implemented method for automatic pairing of two devices for wireless communication, the computer-implemented method comprising:
   detecting, by a first device, a second device in a communicable range of the first device, wherein the first device has not been paired with the second device for wireless communication;
   determining, by the first device, by communicating with a third device, that the second device is paired with the third device, wherein the first device and the third device are paired previously;
   establishing, by the first device, a new communication session with the third device that causes the third device to generate key material for pairing the first device and the second device together and transmit the key material to the second device, wherein the key material is generated using a key derivation function and the key material comprises a non-overlapping binary string;
   confirming, by the first device, that the key material at the first device matches key material at the second device; and
   establishing, by the first device, a communication link with the second device for wireless communication in response to the key material being a match.

2. The computer-implemented method of claim 1, wherein confirming that the key material matches at the first device and the second device is performed using a predetermined function that takes the key material as a parameter and compares respective outputs of the predetermined function.

3. The computer-implemented method of claim 2, wherein the predetermined function comprises one from a group of an out-of-band pairing confirmation, a numeric comparison pairing confirmation, and a passkey entry confirmation.

4. The computer-implemented method of claim 1, further comprising displaying a prompt to a user to notify that the first device and the second device have been paired.

5. The computer-implemented method of claim 4, wherein the prompt includes a user-interaction element to delete the pairing between the first device and the second device.

6. The computer-implemented method of claim 4, wherein the prompt is displayed on the first device.

7. The computer-implemented method of claim 1, wherein the first device is a vehicle infotainment system, and the third device is a vehicle key controller.

8. A system, comprising:
   a first device;
   a second device; and
   a third device that is paired for communication with the first device, wherein:
   the first device is configured to:
      detect that the second device is in a communicable range of the first device, and that the first device has not been paired with the second device for wireless communication;
      determine, by communicating with the third device, that the second device is paired with the third device;
      establish a new communication session with the third device that causes the third device to generate key material for pairing the first device and the second device together and transmit the key material to the second device, wherein the key material is generated using a key derivation function and the key material comprises a non-overlapping binary string;
      confirm with the second device that the key material at the first device matches key material at the second device; and
      establish a communication link with the second device for wireless communication in response to the key material being a match.

9. The system of claim 8, wherein confirming that the key material matches at the first device and the second device is performed using a predetermined function that takes the key material as a parameter and compares respective outputs of the predetermined function.

10. The system of claim 9, wherein the predetermined function comprises one from a group of an out-of-band pairing confirmation, a numeric comparison pairing confirmation, and a passkey entry confirmation.

11. The system of claim 8, wherein the first device is further configured to display a prompt to a user to notify that the first device and the second device have been paired.

12. The system of claim 11, wherein the prompt includes a user-interaction element to delete the pairing between the first device and the second device.

13. The system of claim 11, wherein the prompt is displayed on the first device.

14. A vehicle comprising:
a first device comprising a computer readable storage device comprising instructions that are executable by one or more processors to cause the first device to:
detect a second device in a communicable range of the first device, wherein the first device has not been paired with the second device for wireless communication;
determine, by communicating with a third device, that the second device being paired with the third device, wherein the first device and the third device being are paired previously;
establish a new communication session with the third device that causes the third device to generate key material for pairing the first device and the second device together and transmit the key material to the second device, wherein the key material is generated using a key derivation function and the key material comprises a non-overlapping binary string;
confirm that the key material at the first device matches key material at the second device; and
establish a communication link with the second device for wireless communication in response to the key material being a match.

15. The vehicle of claim 14, wherein confirming that the key material matches at the first device and the second device comprises is performed using a predetermined function that takes the key material as a parameter and compares respective outputs of the predetermined function.

16. The vehicle of claim 15, wherein the predetermined function comprises one from a group of an out-of-band pairing confirmation, a numeric comparison pairing confirmation, and a passkey entry confirmation.

17. The vehicle of claim 14, wherein the first device is further configured to cause to display a prompt to a user to notify that the first device and the second device have been paired.

18. The vehicle of claim 17, wherein the prompt includes a user-interaction element to delete the pairing between the first device and the second device.

19. The vehicle of claim 17, wherein the prompt is displayed on the first device.

20. The vehicle of claim 14, wherein the first device is a vehicle infotainment system, and the third device is a vehicle key controller.

* * * * *